United States Patent [19]
Fishburn et al.

[11] Patent Number: 5,598,377
[45] Date of Patent: Jan. 28, 1997

[54] METHOD FOR CORRECTING COMPRESSIONAL VELOCITY WELL LOGS FOR EFFECTS OF GAS IN EARTH FORMATIONS

[75] Inventors: Todd K. Fishburn; Jane E. Thomas Smith, both of Houston, Tex.

[73] Assignee: Western Atlas International, Inc., Houston, Tex.

[21] Appl. No.: 539,123

[22] Filed: Oct. 4, 1995

[51] Int. Cl.$^6$ ............................................. G01V 1/40
[52] U.S. Cl. ........................ 367/31; 367/25; 367/75
[58] Field of Search .................... 367/25, 28, 31, 367/32, 75; 364/422; 73/152.05, 152.06

[56] References Cited

U.S. PATENT DOCUMENTS

| | | | |
|---|---|---|---|
| 4,636,994 | 1/1987 | Fertl et al. | 367/75 |
| 4,692,910 | 9/1987 | Sondergeld et al. | 367/75 |
| 4,972,384 | 11/1990 | Williams | 367/75 |

*Primary Examiner*—Ian J. Lobo
*Attorney, Agent, or Firm*—Richard A. Fagin

[57] ABSTRACT

A method of correcting compressional velocity well log measurements for the effects of gas in the pore space of earth formations. The method includes the steps of determining a relationship between measurements of shear velocity and a ratio of measurements of compressional velocity with respect to shear velocity for the earth formations for when the earth formations are substantially liquid-filled. A first boundary of the relationship is determined for when the earth formations are substantially composed of shale, a second boundary is determined for when the earth formations are substantially devoid of shale. A cutoff is determined by adjusting an ordinate intercept value of the relationship to substantially include shear velocity and compressional velocity measurements corresponding to the earth formation having gas in the pore space. The cutoff is set to substantially exclude shear and compressional velocity measurements corresponding to the earth formations being substantially liquid-filled. For each measurement of shear and compressional velocity included within the cutoff a shale volume and a corrected ratio of compressional velocity to shear velocity is determined. The corrected ratio is determined by scaling with respect to the shale volume between the first boundary the said second boundary. For each corrected ratio thus determined, the corrected ratio is applied to a corresponding measurement of shear velocity to calculate corrected compressional velocity.

23 Claims, 6 Drawing Sheets

METHOD FOR CORRECTING COMPRESSIONAL VELOCITY WELL LOGS FOR EFFECTS OF GAS IN EARTH FORMATIONS

BACKGROUND OF THE INVENTION

1. Field of the Invention

The present invention is related to the field of well log interpretation. More specifically, the present invention is related to methods for determining porosity of earth formations using acoustic velocity well logging measurements, when the earth formations contain gas in the pore space.

2. Description of the Related Art

Well logging determining acoustic velocity of earth formations is known in the art. Well logging for determining acoustic velocity includes inserting a sonde, having acoustic transducers disposed thereon at axially spaced apart locations, into a wellbore penetrating the earth formations. One of the transducers, called a transmitter, periodically emits pulses of acoustic energy into the wellbore. The acoustic energy pulses interact with the wall of the wellbore so as to travel along the wellbore wall. Some of the energy eventually returns to other transducers, called receivers. The receivers generate electrical signals in response to the acoustic energy. Various electrical circuits, which can be disposed in the sonde or at the earth's surface, interpret the electrical signals to determine the amount of time taken by the acoustic energy pulses in traversing the distance between the transmitter and the receivers, or alternatively, between any two of the receivers. The amount of time the acoustic pulses take to traverse the distance can correspond to the acoustic velocity of the earth formations within which the sonde is positioned at the time the acoustic energy pulses are emitted and detected.

A typical acoustic well logging instrument can include different types of transmitters, and corresponding receivers, each type of transmitter emitting acoustic energy which propagates in a different mode. One type of transmitter can emit acoustic energy pulses that propagate in a mode in which the pulses travel through the earth formations at the compressional velocity of the earth formations. If the shear velocity of the earth formations is greater than the compressional velocity of the fluid filling the wellbore, this type of transmitter can also cause generation of shear energy by mode conversion at the wellbore wall, and this shear energy may be detected by the receivers. Another type of transmitter can emit acoustic energy pulses that propagate in a mode in which the pulses travel through the earth formations at a velocity which substantially corresponds to the shear velocity of the earth formations. The typical acoustic well logging tool can simultaneously generate travel time measurements corresponding to either or both the compressional and the shear velocities of the earth formations. A tool having an arrangement of transmitters and corresponding receivers capable of measuring both compressional and shear velocities is known in the art and is described, for example, in "Multipole Array Acoustilog", Western Atlas Logging Services, Houston, Tex., 1992.

As is understood by those skilled in the art, the compressional velocity of a particular earth formation can be related to the fractional amount of pore space present in the particular earth formation. The fractional amount of pore space, referred to as porosity, is a highly useful quantity and is determined, among other reasons, in order to estimate volumes of producible fluid which may be extracted from the particular earth formation. The porosity (referred to by the symbol $\phi$) is typically determined from the compressional velocity by a relationship known in the art as the Wyllie time average relationship, which can be expressed as:

$$\phi = \frac{\Delta t_{log} - \Delta t_{ma}}{\Delta t_{fl} - \Delta t_{ma}} \quad (1)$$

where $\Delta t_{ma}$ represents the compressional velocity (expressed in equation (1) as reciprocal velocity, or "interval travel time", usually presented in units of microseconds per foot) of the rock minerals making up the particular earth formation, $\Delta t_{fl}$ represents the interval travel time of fluid present in the pore space of the earth formation, and $\Delta t_{log}$ represents the interval travel time of compressional acoustic energy as measured by the acoustic well logging instrument.

As can be inferred from equation (1), the compressional velocities of the rock minerals and of the fluid in the pore space of the particular earth formation must be determined in order to calculate the porosity using the relationship in equation (1). Rock minerals of typical earth formations penetrated by wellbores for the purpose of extracting fluids typically consist essentially of combinations of quartz sand, limestone (calcium carbonate), and dolomite (calcium-magnesium carbonate), whose interval travel times are well known. For purposes of calculating the porosity of the earth formations from velocity measurements made by the acoustic logging instrument, the pore space is typically assumed to be filled with water. Water typically has an interval travel time within a range of 189 to 210 microseconds per foot.

As is understood by those skilled in the an, the pore space of some earth formations can contain gas. Gas typically has a substantially slower velocity (and therefore larger interval travel time) than does water or any other liquids which can be present in the pore space, such as crude oil. In a particular earth formation, the presence of gas in the pore space generally results in the particular earth formation having a slower compressional velocity (larger interval travel time) than if the same earth formation had pore space filled entirely with liquid. The porosity calculated from the compressional velocity (or interval travel time) using the relationship of equation (1) will therefore typically be erroneously high when gas is present in the pore space of the particular earth formation.

As is also known by those skilled in the art, measurements of shear velocity of earth formations are much less affected by the velocity of the material filling the pore space than are measurements of compressional velocity. Measurements of shear velocity are therefore relatively unaffected by the presence of gas in the pore space of the earth formations. A comparison of the compressional velocity with respect to the shear velocity which indicates a much larger effect on the compressional velocity than on the shear velocity can be indicative of hydrocarbons, particularly gas, being present in the pore space of the earth formation.

A method for indicating the presence of hydrocarbons, particularly gas, in the pore space of the earth formations from comparison of shear and compressional velocities is described, for example, in "The Acoustic Log Hydrocarbon Indicator", D. Michael Williams, Transactions of the SPWLA 31st Annual Logging Symposium, 1990. A limitation of the method described in the Williams reference is that the method does not include any provision for determining the correct value of porosity from the compressional velocity when the earth formations contain gas in the pore space.

Accordingly, it is an object of the present invention to provide a method of determining porosity of earth formation from compressional acoustic velocity of the earth formations which can be compensated for the effects of gas or light crude oil in the pore space of the earth formations.

SUMMARY OF THE INVENTION

The present invention is a method of correcting compressional velocity well log measurements for the effects of gas in the pore space of earth formations. The method includes the steps of determining a relationship between measurements of shear velocity of the earth formations and a ratio of measurements of compressional velocity with respect to shear velocity of the earth formations for when the pore spaces of the earth formations are substantially liquid-filled. A first boundary of the relationship is determined for when the earth formations are substantially composed of shale, and a second boundary is determined for when the earth formations are substantially devoid of shale. A cutoff is determined by adjusting an ordinate intercept value of the relationship to substantially include shear velocity and compressional velocity measurements corresponding to the earth formation having gas in the pore space. The cutoff is set to substantially exclude shear and compressional velocity measurements corresponding to the earth formations being substantially liquid-filled. For each measurement of shear and compressional velocity included within the cutoff a shale volume and a corrected ratio of compressional velocity to shear velocity is determined. The corrected ratio is determined by scaling with respect to the shale volume between the first boundary the said second boundary. For each corrected ratio thus determined, the corrected ratio is applied to a corresponding measurement of shear velocity to calculate corrected compressional velocity.

In a preferred embodiment of the invention, the steps of determining the relationship, and determining the first and second boundaries are performed by linear regression. In the preferred embodiment of the invention, the shale volume is determined by scaling measurements of natural radioactivity of the earth formations.

DESCRIPTION OF THE PREFERRED EMBODIMENT

The present invention uses measurements of acoustic velocity of earth formations made by an acoustic well logging instrument. The process of generating acoustic velocity measurements of the earth formation with respect to depth in the earth, commonly referred to as recording an acoustic velocity well log, can be better understood by referring to FIG. 1. A wellbore 2 is drilled through earth formations 6. An acoustic well logging instrument 10 is typically lowered into the wellbore 2 attached to one end of an armored electrical cable 20. The cable 20 usually includes an insulated electrical conductor (not shown separately) which is used to conduct electrical power to the instrument 10 and to conduct signals from the instrument 10 to surface electronics 12. The surface electronics 12 are electrically connected to the other end of the cable 6. The surface electronics 12 can include systems for observation, timing and recording of the signals transmitted by the instrument 10, as is understood by those skilled in the art. The cable 20 can be extended into and withdrawn from the wellbore 2 by means of a winch 8 or similar apparatus known in the art.

Figure 1:
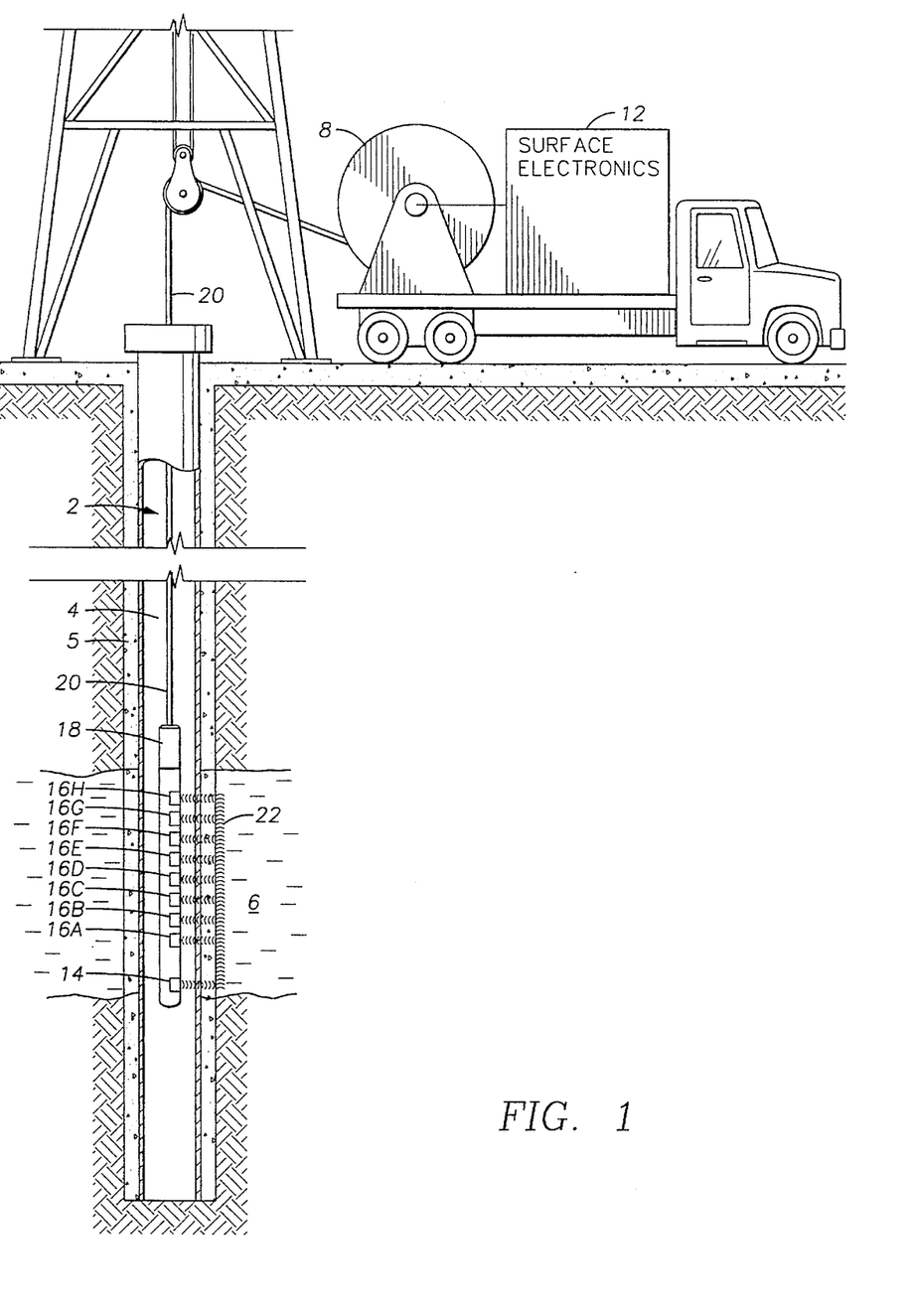
FIG. 1 shows an acoustic velocity well logging instrument being used in a wellbore penetrating earth formations.

The instrument 10 typically includes an acoustic transducer 14, called a transmitter, which periodically emits acoustic energy pulses, shown generally at 22, into the wellbore 2. The acoustic energy pulses 22 interact with the wall of the wellbore 2 so as to travel along the wall of the wellbore 2. As is understood by those skilled in the art, certain wellbores can include a steel pipe or casing, shown at 3, coaxially inserted therein. The casing 3 is typically bonded to the wall of the wellbore 2 by pumping cement, shown generally at 5, around the exterior of the casing 3. The significance of the casing 3 and cement 5 will be further explained. It is to be understood that the present invention can also be used on well logs recorded in a wellbore 2 without the casing 3 and the cement 5, such a wellbore 2 being referred to as an "open-hole", as is understood by those skilled in the art.

After travelling along the wall of the wellbore 2, the acoustic energy pulses 22 eventually reach other acoustic transducers, called receivers and shown at 16A through 16H, located at axially spaced apart locations along the instrument 10. The receivers 16A–16H generate electrical signals in response to detection of the acoustic energy pulses 22. Circuits in the tool, shown generally at 18, convert the electrical signals into a form compatible with transmission along the cable 6 to the surface electronics 12. The transmitted signals can be observed and recorded in the surface electronics 12, and information indicative of the travel time of the acoustic energy pulses 22 between the transmitter 14 and each one of the receivers 16A–16H can be determined therein. As is understood by those skilled in the art, the circuits 18 preferably include an analog-to-digital converter (not shown separately) to enable transmission of the signals to the surface electronics 12 in digital form. It is to be understood that the circuits 18 could also include a recording device (not shown separately) such as a digital memory, to generate a record of the signals in the instrument 10, either in addition to or in substitution of transmission of the signals to the surface electronics 12. It is also to be understood that the circuits 18 could include an analog signal transmission amplifier and filter (not shown) in order to practice the present invention. Selection of digital signal transmission is a matter of convenience for the system designer and is not to be construed as a limitation on the present invention.

The instrument 10 in the present invention preferably includes a transmitter 14 and receivers 16A–16H adapted to generate and detect, respectively, both compressional acoustic energy and acoustic energy which propagates substantially at the shear velocity of the earth formation 6, so that the travel time of the acoustic energy pulses 22 through the earth formation 6 (and as a result the compressional and shear velocities) in both shear propagation mode and compressional propagation mode can be determined. An instrument which includes transmitters 14 and receivers 16A–16H adapted to generate and detect both compressional and shear-equivalent acoustic energy is described, for example, in "Multipole Array Acoustilog", Western Atlas Logging Services, Houston, Tex., 1992. The present invention includes using measurements of both shear velocity and compressional velocity, although it is to be understood that there is no limitation on the present invention that the shear velocity measurements and compressional velocity measurements be made at the same time or by the same instrument 10. For example, in an "open-hole" in which no other acoustic velocity measurements have been made, using an instrument such as the one described in the "Multipole Array Acoustilog" reference, supra, for example, can save the wellbore operator considerable time and expense since both compressional velocity and shear velocity can be measured at the same time, as is understood by those skilled in the art. Alternatively, if the wellbore 2 had been logged at a time prior to insertion of the casing 3 and cement 5, but the acoustic velocity measurements made in the "open-hole" include only measurements of compressional velocity, it is also possible to use an instrument such as the one described in the "Multipole Array Acoustilog" reference, supra, to measure shear velocity after the casing 3 and cement 5 have been inserted into the wellbore 2. Measurements of shear velocity from within the "cased" hole can be combined with the open-hole compressional velocity measurements made previously to practice the present invention. As is understood by those skilled in the art, obtaining measurements of acoustic velocity of the earth formation 6 from within a wellbore having casing inserted therein is improved when the cement 5 provides good acoustic coupling between the casing 3 and the earth formation 6.

The process of generating measurements of shear and compressional velocity of the earth formations 6 having been explained, analyzing the velocity measurements according to the present invention, and calculating values of compressional velocity which are adjusted for the presence of gas in the pore space, will now be explained in more detail.

Analysis of the shear and compressional velocity measurements can include generating a graph, which will be further explained, having shear velocity on the coordinate axis, and a ratio of compressional velocity to shear velocity (referred to as $V_p/V_s$) on the ordinate axis. The graph can comprise a number of individual points, each point having coordinates representing the value of shear velocity (typically represented on the graph as a reciprocal velocity or "interval travel time"—DTS) and the corresponding value of $V_p/V_s$ at the same individual measurement depth within the wellbore (2 in FIG. 1). As is understood by those skilled in the art, $V_p/V_s$ can be calculated from the measured values of DTS and measured values of compressional velocity (typically represented as interval travel time—DTC). Calculating $V_p/V_s$ and generating the graph can be performed, for example, by a general purpose computer program for analysis of well log data, such as one made by Western Atlas Logging Services, Houston, Tex. and sold under the trade name "WDS—Well Data System".

If the system operator uses measurements of shear velocity which had been made at a different time than when the compressional velocities were measured, it is desirable for measurement depths to be matched between the measurements of shear and compressional velocities, prior to generating the graph. Depth matching can be performed, for example, by a computer program such as a subroutine known by the trade name "Automatic Depth Matching—ADM", forming part of the previously described "WDS" log analysis program.

Figure 2:
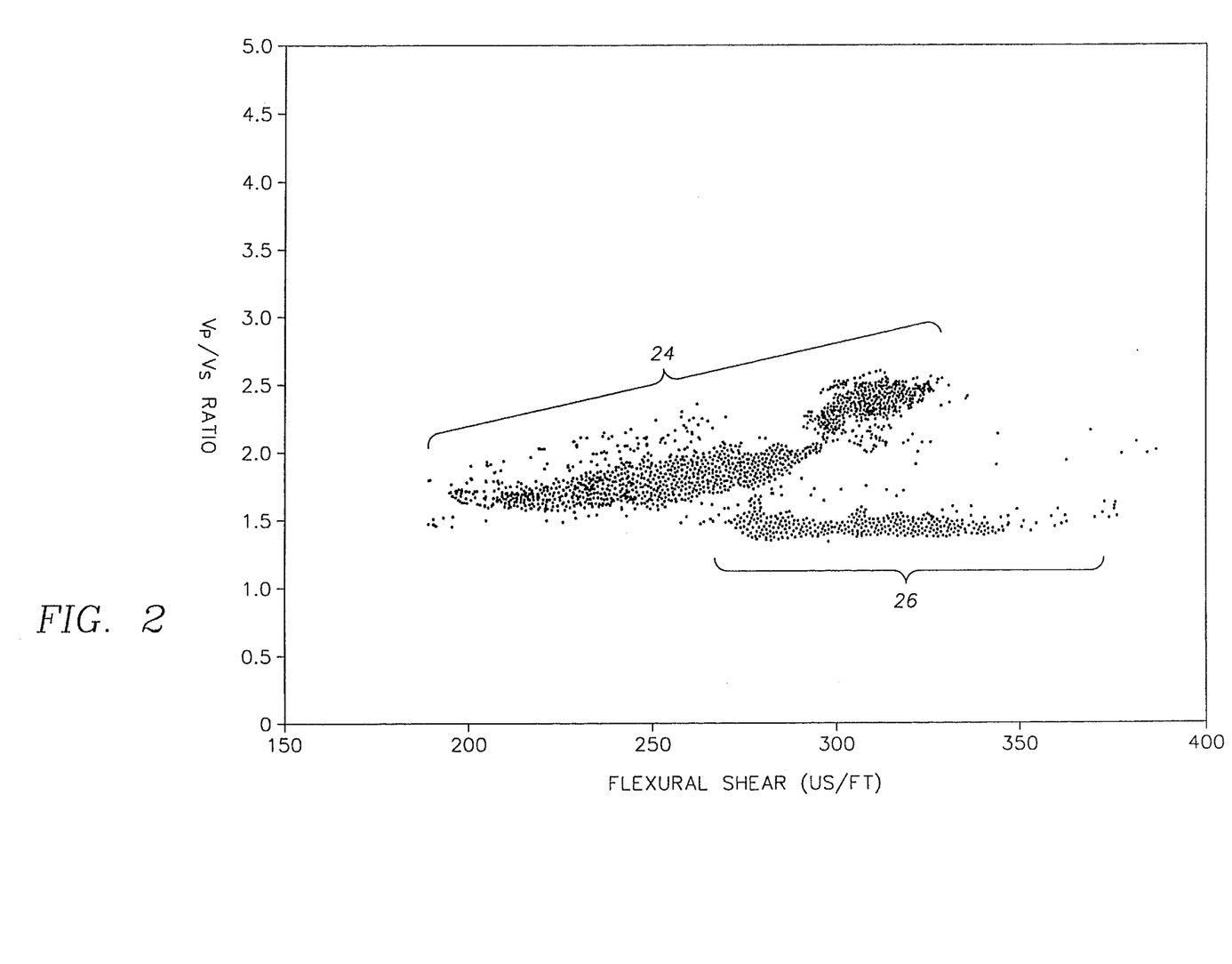
FIG. 2 shows a graph comparing measurements of shear velocity with respect to a ratio of compressional velocity to shear velocity.

A graph having $V_p/V_s$ on the ordinate axis and DTS on the coordinate axis as described herein can be observed by referring to FIG. 2. Points (not identified individually) on the graph of FIG. 2 can be observed as generally located in two different groupings of points, called "trends". A first trend, shown generally at 24, corresponds to earth formations (6 in FIG. 1) in which the pore space is substantially filled with liquid. $V_p/V_s$ for points in the first trend 24 typically increases substantially linearly with respect to DTS. A second trend, shown generally at 26, comprises points which exhibit substantially no change in $V_p/V_s$ with respect to DTS. Points in the second trend 26 can include earth formations (6 in FIG. 1) which have gas in the pore space, wherein compressional velocity is affected by gas in the pore spaces but shear velocity is relatively unaffected by the gas. In earth formations (6 in FIG. 1) having no gas filled pore space, the second trend 26 may be substantially absent from the graph. The significance of the first 24 and second 6 trends will be further explained.

As is understood by those skilled in the art, the value of the $V_p/V_s$ ratio for any particular earth formation can be related both to the shear velocity (DTS) and to the fractional volume in the earth formation of a type of material called shale. Shale, as is known in the art, contains a substantial amount of hydrated clay minerals. The present invention includes a means for correcting the value of the $V_p/V_s$ ratio for the fractional amount of shale in the earth formation (6 in FIG. 1). Fractional volume of shale in the earth formation can be calculated, for example, by using measurements of natural radioactivity, or a combination of measurements of bulk density and hydrogen index of the earth formation, as is understood by those skilled in the art.

Figure 3:
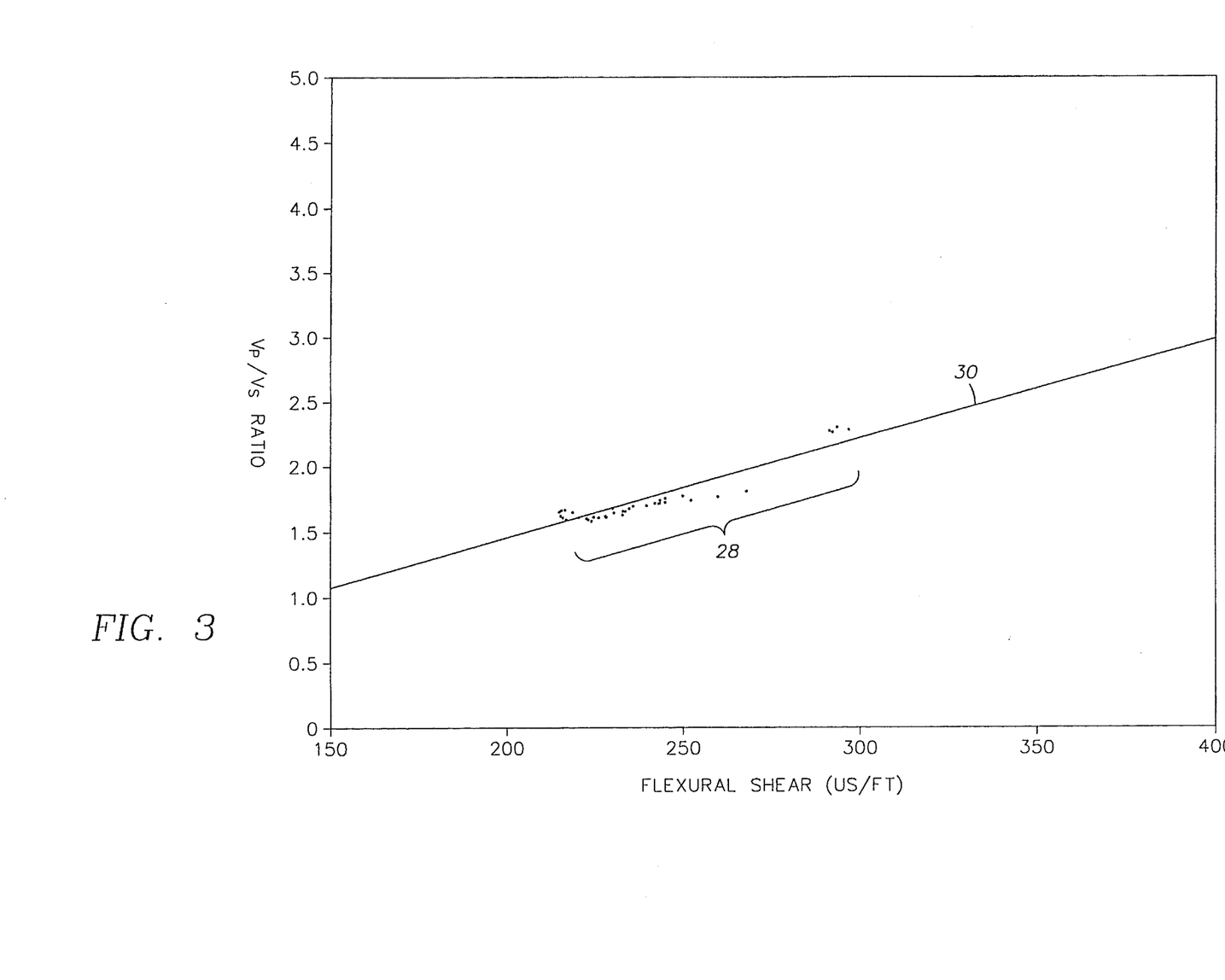
FIG. 3 shows a graph as in FIG. 2 wherein the earth formations are substantially composed of shale.

FIG. 3 includes points, shown generally at 28, which represent a subset of the earth formations plotted in the graph of FIG. 2. The subset of the earth formations plotted as the points 28 in FIG. 3 have about 90 percent fractional volume of shale. A relationship of $V_p/V_s$ with respect to DTS is determined for the points 28. The relationship can be determined by linear regression or other calculation method known in the art. The relationship of the points 28 can be observed as a first line 30. The significance of the first line 30 will be further explained.

Figure 4:
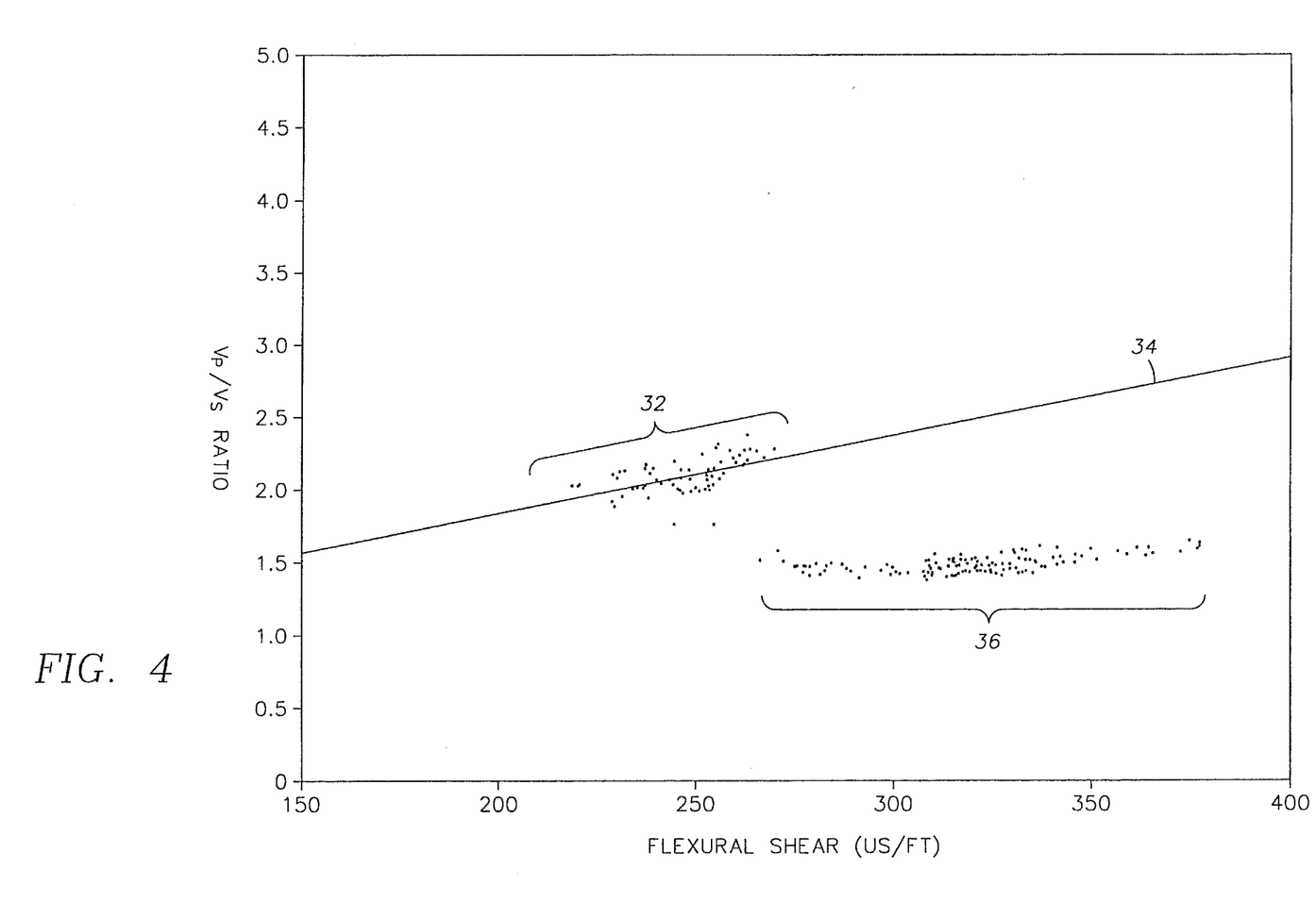
FIG. 4 shows a graph as in FIG. 2 wherein the earth formations are substantially devoid of shale.

As shown in FIG. 4, the process of plotting and determining a relationship of the points, shown generally at 32, is repeated fur another subset of the earth formations having fractional volume of shale of about 10 percent. The relationship is shown in FIG. 4 as a second line 34. FIG. 4 also exhibits a significant cluster of points, shown at 36, corresponding to the second trend (shown at 26 in FIG. 2). The cluster 36 is typically present in graphs, such as the one in FIG. 4, of earth formations having small fractional volumes of shale, but is largely absent from graphs, such as the one in FIG. 3, of earth formations having large fractional volumes of shale. Shale typically masks the effect of gas on acoustic velocity well log measurements, as is understood by those skilled in the art.

Algebraic representations of the first line (30 in FIG. 3) and the second line (34 in FIG. 4) in the well known form of $y=mx+b$, constitute boundaries of a series of scaling factors which are used to calculate an adjusted $V_p/V_s$ ratio for earth formation having gas in the pore space, such as those represented by points in the cluster (36 in FIG. 4). The adjusted $V_p/V_s$ ratio represents what the $V_p/V_s$ ratio would likely have been if the earth formation having gas in its pore space were completely liquid-filled instead.

Figure 5:
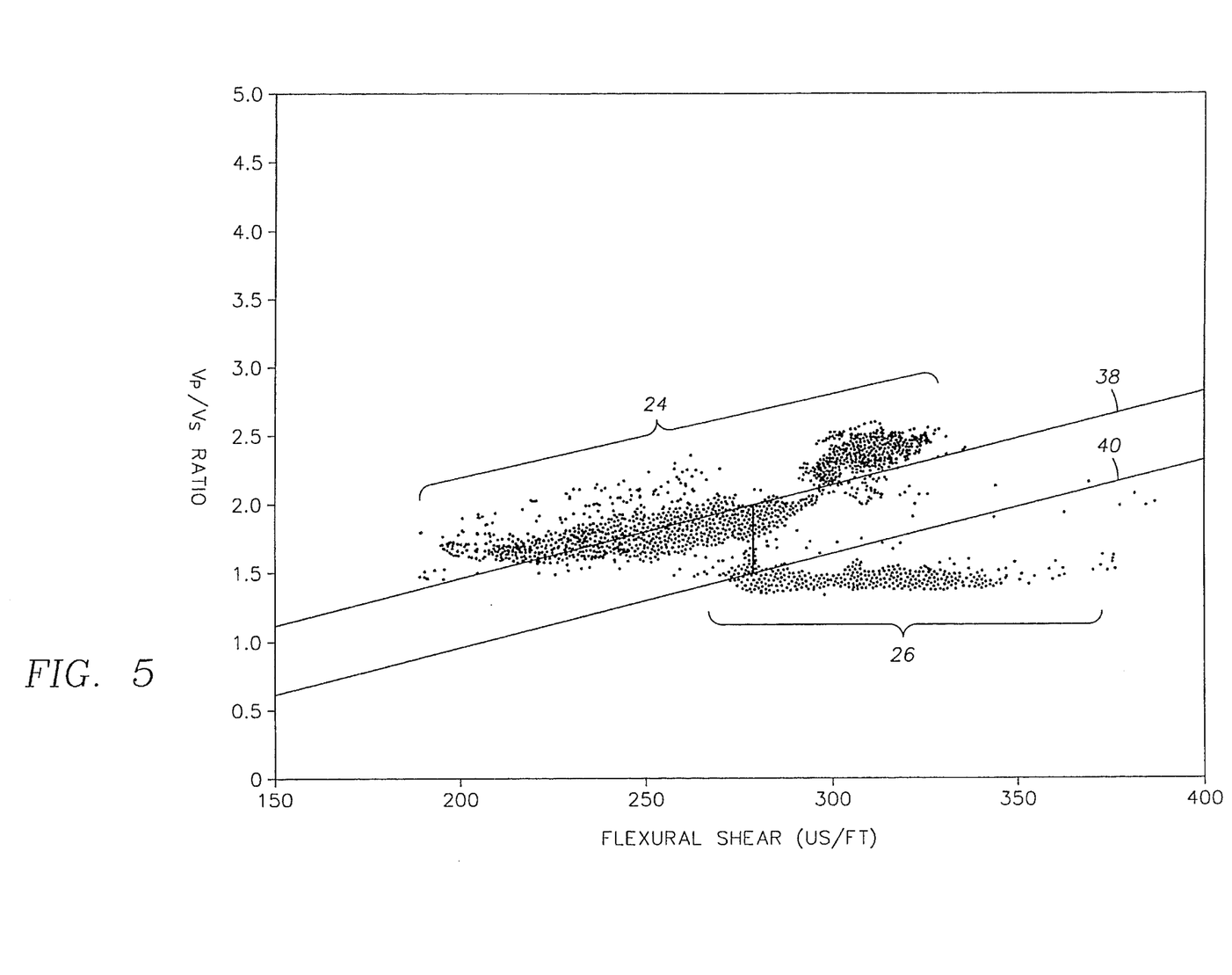
FIG. 5 shows a graph as in FIG. 2 in which a cutoff separating gas-containing earth formations from earth formations having liquid-filled pore space.

The process of calculating the adjusted $V_p/V_s$ ratio can be better understood by referring to FIG. 5. FIG. 5 is a graph showing all the points, similarly to FIG. 2. A third line, shown at 38, can be determined by linear regression to calculate a relationship of the first trend (shown in FIG. 2 at 24). A cutoff, shown as a fourth line 40, is determined by adjusting only the y-intercept of the third line 38, while maintaining the same slope as the third line 38. The y-intercept of the third line 38 is adjusted until the cutoff 40 approximately "touches" the second trend 26. In the process of the present invention, points positioned below the cutoff 40 (typically higher DTS or lower $V_p/V_s$ ratio) will be adjusted by a process which will be further explained, while those points occurring above the cutoff 40 will remain unadjusted. It is contemplated that the process of determining the cutoff 40 can be automated by appropriate programming of a general purpose computer (not shown). The process shown herein is meant to serve only as an illustration of the process of the present invention.

Gas-corrected DTC (compressional interval travel time) can be calculated as follows: for every point determined to be in the second trend (26 in FIG. 2), a fractional shale volume ($V_{sh}$) can be calculated for each point using depth-correspondent natural radioactivity measurements, or depth-correspondent bulk density and hydrogen index measurements as previously described herein. The fractional shale volume can then be used to linearly scale at each point between the slope value of the first line (30 in FIG. 3 and referred to by $M_{sh}$) and the slope value of the second line (34 in FIG. 4 and referred to by $M_{sd}$). The scaling can be expressed as:

$$m_{corr} = m_{sd} + V_{sh}[m_{sh} - m_{sd}] \quad (2)$$

Corrected values of an intercept ($A_{corr}$) can be calculated similarly:

$$a_{corr} = a_{sd} + V_{sh}[m_{sh} - m_{sd}] \quad (3)$$

wherein $a_{sd}$ and $a_{sh}$ are, respectively, the intercepts of the second line (34 in FIG. 4) and the first line (30 in FIG. 3).

Adjusted $V_p/V_s$ ratio can then be calculated for each point by scaling the measured value of DTS (shear interval travel time) according to the expression:

$$\frac{V_p}{V_{s(corr)}} = (m_{corr} * DTS) + a_{corr} \quad (4)$$

and a gas-corrected value of DTC (compressional interval travel time) can then be determined tier each point according to the expression:

$$DTC_{corr} = DTS \div \frac{V_p}{V_{s(corr)}} \quad (5)$$

Figure 6:
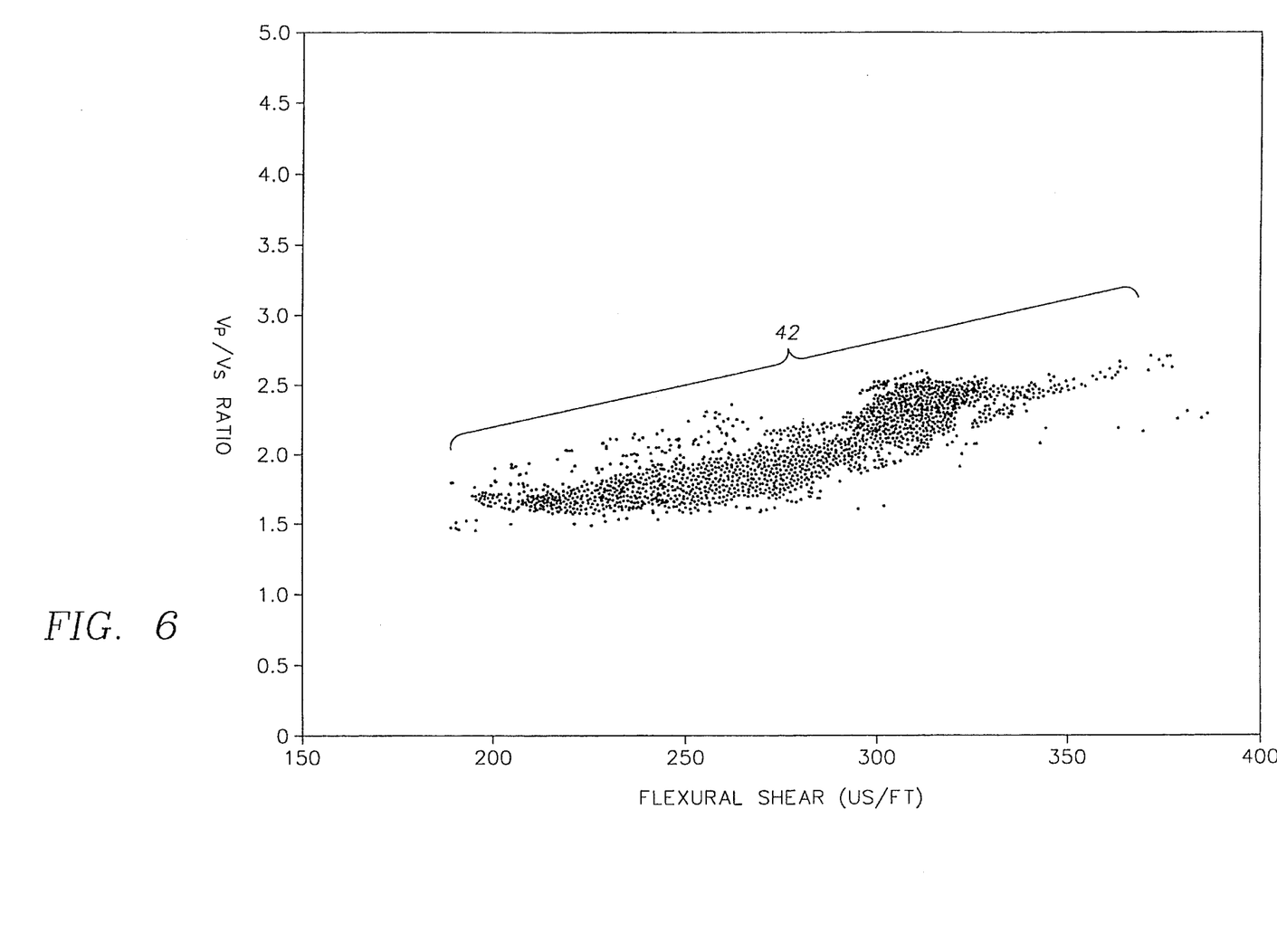
FIG. 6 shows as graph as in FIG. 5 wherein the ratio trend with respect to shear velocity of the gas-containing earth formations has been normalized to the trend of the earth formations having liquid-filled pore space.

It is preferable to verify the accuracy of the adjustment by plotting the points for which adjusted $V_p/V_s$ ratios were calculated. A graph having unadjusted points from the first trend (24 in FIG. 2), and adjusted points originating in the second trend (26 in FIG. 2) can be observed by referring to FIG. 6. The points in the graph of FIG. 6 show substantially a single, contiguous trend, shown generally at 42. Should the graph of unadjusted points combined with adjusted points show more than one trend, the process of selecting the cutoff (shown in FIG. 5 as 40) and calculating adjusted $V_p/V_s$ ratios can be repeated.

If the system operator so desires, the gas-corrected values of DTC corresponding to each measurement depth can be displayed in a well log format. Gas-corrected values of porosity ($\phi$) of the earth formation (6 in FIG. 1) can be calculated from the gas-corrected DTC values by using a relationship known in the art as the Wyllie time average relationship:

$$\phi = \frac{DTC - DT_{ma}}{DT_{fl} - DT_{ma}} \quad (6)$$

where $DT_{ma}$ represents the interval travel time of the rock minerals of the earth formation, and $DT_{fl}$ represents the interval travel time of the liquid in the pore space of the earth formation.

Those skilled in the art will readily devise improvements and other embodiments of the present invention which do not depart from the spirit of the invention disclosed herein. Accordingly, the present invention should only be limited in scope by the claims appended hereto.

What is claimed is:

1. A method of correcting compressional velocity well log measurements for effects of gas in pore space of earth formation, said method comprising the steps of:

determining a relationship between measurements of shear velocity and a ratio of measurements of compressional velocity with respect to said shear velocity for said earth formations, wherein said pore space of said earth formations is substantially liquid-filled;

determining a first boundary of said relationship corresponding to when said earth formations are substantially composed of shale;

determining a second boundary of said relationship corresponding to when said earth formation are substantially devoid of shale;

determining a cutoff by adjusting an ordinate intercept value of said relationship to substantially include said shear velocity and compressional velocity measurements corresponding to said earth formation having gas in said pore space, said cutoff substantially excluding said shear and compressional velocity measurements corresponding to said earth formations being substantially liquid-filled;

for each measurement of shear and compressional velocity included within said cutoff, determining a shale volume and a corrected ratio of compressional velocity to shear velocity, said corrected ratio determined by scaling with respect to said shale volume between said first boundary and said second boundary; and for each corrected ratio thus determined, applying said corrected ratio to a corresponding measurement of said shear velocity to calculate corrected compressional velocity.

2. The method as defined in claim 1 further comprising calculating corrected porosity from said corrected compressional velocity.

3. The method as defined in claim 1 wherein said shear velocity is measured after said compressional velocity is measured, said shear velocity measured in a wellbore having a casing inserted therein.

4. The method as defined in claim 1 wherein said compressional velocity and said shear velocity are measured substantially simultaneously.

5. The method as defined in claim 1 wherein said step of determining said first boundary and said step of determining said second boundary comprise determining shale volume by scaling a measurement of natural radioactivity of said earth formations.

6. The method as defined in claim 1 wherein said step of determining said first boundary and said step of determining said second boundary comprise determining shale volume by scaling measurements of bulk density and measurements of hydrogen index of said earth formations.

7. The method as defined in claim 1 wherein said relationship is determined by linear regression.

8. The method as defined in claim 1 wherein said first and said second boundaries are determined by linear regression.

9. A method of correcting measurements of compressional velocity in earth formations having gas within pore space in said earth formations, comprising the steps of:

lowering an acoustic velocity well logging instrument into a wellbore drilled through said earth formations, said well logging instrument having transducers disposed thereon adapted to measure travel time of acoustic energy propagating through said earth formations at said compressional velocity and substantially at shear velocity of said earth formations;

measuring said compressional velocity and said shear velocity in said wellbore;

determining a relationship between measurements of said shear velocity and a ratio of measurements of said compressional velocity with respect to said shear velocity for said earth formations, wherein said earth formations are substantially liquid-filled;

determining a first boundary of said relationship corresponding to when said earth formations are substantially composed of shale;

determining a second boundary of said relationship corresponding to when said earth formations are substantially devoid of shale;

determining a cutoff by adjusting an ordinate intercept value of said relationship to substantially include said shear velocity and compressional velocity measurements corresponding to said earth formation having gas in said pore space, said cutoff substantially excluding said shear and compressional velocity measurements corresponding to said earth formations being substantially liquid-filled;

for each measurement of shear and compressional velocity included within said cutoff, determining a shale volume and a corrected ratio of compressional velocity to shear velocity, said corrected ratio determined by scaling with respect to said shale volume between said first boundary and said second boundary; and for each corrected ratio thus determined, applying said corrected ratio to a corresponding measurement of said shear velocity to calculate corrected compressional velocity.

10. The method as defined in claim 9 further comprising calculating corrected porosity from said corrected compressional velocity.

11. The method as defined in claim 9 wherein said shear velocity is measured after said compressional velocity is measured, said shear velocity measured in a wellbore having a casing inserted therein.

12. The method as defined in claim 9 wherein said compressional velocity and said shear velocity are measured substantially simultaneously.

13. The method as defined in claim 9 wherein said step of determining said first boundary and said step of determining said second boundary comprise determining shale volume by scaling a measurement of natural radioactivity of said earth formations.

14. The method as defined in claim 9 wherein said step of determining said first boundary and said step of determining said second boundary comprise determining shale volume by scaling measurements of bulk density and measurements of hydrogen index of said earth formations.

15. The method as defined in claim 9 wherein said relationship is determined by linear regression.

16. The method as defined in claim 9 wherein said first and said second boundaries are determined by linear regression.

17. A method of correcting measurements of compressional velocity in earth formations having gas within pore space in said earth formations, comprising the steps of:

lowering an acoustic velocity well logging instrument into a wellbore drilled through said earth formations, said well logging instrument having transducers disposed thereon adapted to measure travel time of acoustic energy propagating through said earth formations substantially at a shear velocity of said earth formations;

measuring said shear velocity in said wellbore;

obtaining measurements of said compressional velocity of said earth formation made at a time different from a time at which said step of measuring said shear velocity is performed;

determining a relationship between measurements of said shear velocity and a ratio of measurements of said compressional velocity with respect to said shear velocity for said earth formations, wherein said earth formations are substantially liquid-filled;

determining a first boundary of said relationship corresponding to when said earth formations are substantially composed of shale;

determining a second boundary of said relationship corresponding to when said earth formations are substantially devoid of shale;

determining a cutoff by adjusting an ordinate intercept value of said relationship to substantially include said shear velocity and compressional velocity measurements corresponding to said earth formation having gas in said pore space, said cutoff substantially excluding said shear and compressional velocity measurements corresponding to said earth formations being substantially liquid-filled;

for each measurement of shear and compressional velocity included within said cutoff, determining a shale volume and a corrected ratio of compressional velocity to shear velocity, said corrected ratio determined by scaling with respect to said shale volume between said first boundary and said second boundary; and for each corrected ratio thus determined, applying said corrected ratio to a corresponding measurement of said shear velocity to calculate corrected compressional velocity.

18. The method as defined in claim 17 further comprising the step of depth matching said measurements of compressional velocity with said measurements of shear velocity prior to said step of determining said relationship.

19. The method as defined in claim 18 further comprising calculating corrected porosity from said corrected compressional velocity.

20. The method as defined in claim 18 wherein said step of determining said first boundary and said step of determining said second boundary comprise determining shale volume by scaling a measurement of natural radioactivity of said earth formations.

21. The method as defined in claim 18 wherein said step of determining said first boundary and said step of determining said second boundary comprise determining shale volume by scaling measurements of bulk density and measurements of hydrogen index of said earth formations.

22. The method as defined in claim 18 wherein said relationship is determined by linear regression.

23. The method as defined in claim 18 wherein said first and said second boundaries are determined by linear regression.

* * * * *